UNITED STATES PATENT OFFICE.

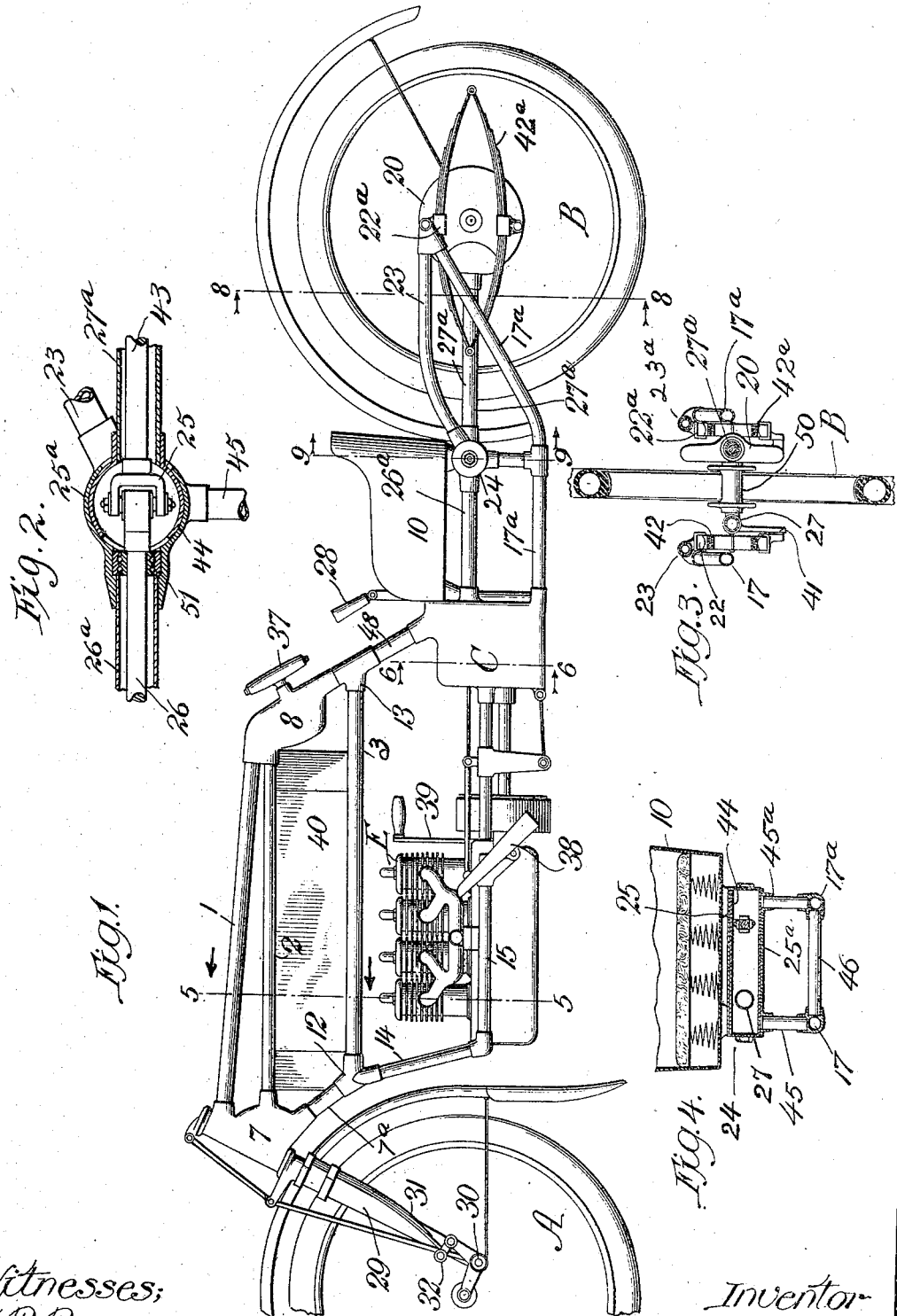

ALLEN ASA HORTON, OF DETROIT, MICHIGAN.

MOTOR-CYCLE.

1,044,051.

Specification of Letters Patent. Patented Nov. 12, 1912.

Application filed July 23, 1910. Serial No. 573,371.

*To all whom it may concern:*

Be it known that I, ALLEN A. HORTON, a citizen of the United States, residing at Detroit, county of Wayne, State of Michigan, have invented a certain new and useful Improvement in Motor-Cycles, and declare the following to be a full, clear, and exact description of the same, such as will enable others skilled in the art to which it pertains to make and use the same, reference being had to the accompanying drawings, which form a part of this specification.

This invention relates to motor cycle frames and especially to the rear suspension thereof.

It has for its object an improved motor driven bicycle, in which the frame which supports the engine is itself supported from the wheels by spring suspension members.
The connection between the frame and the rear wheel is by means of a fork, the ends of which rest on elliptic springs that are supported at either side of the rear wheel axle and the wheel is driven by means of a flexible shaft inclosed in a casing capable of a limited oscillation with respect to the main part of the frame. Suitable change speed gear is located in the case directly in front of the seat and suitable foot rests are provided at the sides of the frame.

In the drawings: Figure 1, is a side elevation of the assembled machine. Fig. 2, is a cross section of a flexible joint in the two part driving shaft casing, showing the driving shaft and its universal joint in elevation. Fig. 3, is a cross section on the line 8—8 of Fig. 1 viewed from the direction of the arrows. Fig. 4, is a cross section on the line 9—9 of Fig. 1.

The main frame consists of a longitudinal member 1 which is inclined slightly to the other longitudinal frame members and serves as a bracing member between the head 7 of the front fork and the head 8 of the brace 48 that rises from the transmission casing C immediately in front of the seat 10. A tie member 2 located almost directly beneath the longitudinal member 1 is hollow and serves as a casing or sheath for the steering rod (not shown) but which connects the steering handle 37 with the front fork. Beneath the member 2 is a longitudinal member 3, which, with the members 1 and 2 comprise the main upper parts of the frame. The head 7 is connected with the coupling 12 by a short inclined bar 7ª. The coupling 12 connects the bar 7ª with the longitudinal member 3 and also serves to connect both of these with the suspension bars 14 (only one of which shows in Fig. 1, the other being located directly behind it). These suspension bars suspend the longitudinal members 15 (only one of these shows in Fig. 1, the other being on the other side of the engine E and directly behind the bar marked 15 in this figure). These bars form the main support for the engine E and the transmission casing C in which latter member is contained the transmission gearing. Extending from the transmission case C are frame members 17 and 17ª which extend as forks on either side of the rear wheel. The frame member 17ª does not connect directly with the gear casing but to a shackle 22ª of an elliptical spring 42ª which is itself connected to the gear casing 20 below its center. The frame member 17 is shackled to an elliptical spring 42 on the other side of the rear wheel. The spring 42 at its lower midmost portions is shackled to a hanger 41 connected with the axle 50. The auxiliary frame members 23 and 23ª extend forward from the shackles 22 and 22ª to the hinging joint 24 immediately to the rear of and below the seat 10. This hinging joint 24 serves as a case for a universal joint 25 between the shaft 26 which runs forward to the engine E and the shaft 43 which extends rearward to the casing 20. The hinging joint 24 is made up of two hollow slotted cylinders 25ª and 44. The outer cylinder 25ª is inclosed at its end and is connected with the transmission casing C by the hollow tubular drive shaft casing 26ª. The inner cylinder 44 is connected with the rear drive shaft casing 27ª and the bar 27 located on the opposite side of the rear wheel and connecting with the rear axle 50. The inner cylinder may oscillate in the outer cylinder through the limits of the slot in the outer cylinder and there is, thereby, secured an oscillatory connection between the rear wheel and the main frame. Within this hinging joint 24 is a universal coupling 25 that connects the two parts 26 and 43 of the driving shaft, the part 26 being supported in the outer cylinder 25ª by the ball bearing 51. The hinging joint 24 is supported upon the frame members 17 and 17ª by upright bars 45 and 45ª and frame members 17 and 17ª and braced together as are also the upright bars 45 and 45ª by the cross brace 46.

In the main drawing the shafts appear only inferentially, inasmuch as each shaft is inclosed within its casing which forms the real frame work of the vehicle. A variable transmission located in the casing C may be of any approved variety or style and is actuated by hand lever 28 to carry or regulate the speed of the vehicle, as compared with the speed of the engine. A fork 29 supports the front part of the main frame and is rotatably journaled in the head 7 which is supported on the fork. The fork 29 is in pivotal connection with a bent arm 30, one end of which supports the axle of the front wheel and the other end of which bears against a spring 31 by means of a shackle connection 32 and furnishes a resilient or spring connection to the axle of the front wheel. The fork 29 may oscillate on its own axis in the head 7 to effect the necessary steering movement of the front wheel. The necessary oscillation of the front fork is produced by a manual actuation of the steering handle 37 provided with necessary connections inclosed in the longitudinal member 2 and which are not shown in the drawings, as they may be supplied by any mechanic and are not part of the invention. A foot rest 38 is suppported by the frame bar 15 at the side of the main frame and in suitable relation to the seat 10 to accommodate the rider of the vehicle. A similar foot rest (not shown) is supported by the frame bar on the other side. The engine E is an ordinary air cooled internal combustion engine and is fed with fuel from a tank 40 located between the bars 2 and 3. It has not been thought necessary to show the fuel connection, wire connections and other similar parts which may be varied to correspond with the particular style of engine which is used.

What I claim is:—

1. In a motor cycle, the combination of a transmission casing, a pair of frame members extending rearwardly therefrom, a pair of upright bars rising from the frame members, a slotted cylinder supported by said upright bars, an inner slotted cylinder oscillatory in said first mentioned cylinder, a drive shaft casing leading from the transmission casing to the outer slotted cylinder, a pair of companion bars fast to the inner cylinder, one of them being adapted as a drive shaft casing, a gear case attached to the end of said rear axle adapted to act as a drive shaft casing, a rear axle attached to the gear case at one end and to the bar at the opposite end, a wheel rotatable on said rear axle and positioned between the separate members of the pairs of frame members and companion bars, a pair of elliptical springs, one spring having its under-half fastened to the gear case and the other spring having its under-half connected with the rear axle, the said springs supporting with their upper halves the ends of the frame members and auxiliary frame members extending from the frame member ends and attached to the said outer cylinder, substantially as described.

2. In a motor cycle, the combination of a rear wheel, an axle upon which the same rotates, a gear case at one end of the axle, a main frame having members straddling said rear wheel and provided with a slotted cylinder, an inner hollow cylinder rotatably fitting in said slotted cylinder, a pair of companion bars attached to said inner cylinder, one bar opening into the interior of said inner hollow cylinder and extending to and opening into said gear case, thereby adapted to act as a drive shaft case, the other bar being fastened to the end of the rear axle opposite the gear case, and springs connecting the ends of the frame members on one side of the wheel to the axle end and on the other side of the wheel to the gear case, substantially as described.

3. In a motor cycle, the combination of a rear wheel, an axle upon which the same rotates, a gear case attached to one end of the axle, a main frame having two pairs of frame members straddling said rear wheel, said main frame having also a slotted cylinder, an inner cylinder oscillatory therein, a pair of companion bars attached to the inner cylinder, one connected with the axle and the other connected with the gear case at the opposite end of the axle and adapted to act as a drive shaft casing, a pair of springs supporting the ends of the two pairs of frame members yieldingly upon the gear case and the end of the axle opposite the gear case, substantially as described.

In testimony whereof, I sign this specification in the presence of two witnesses.

ALLEN ASA HORTON.

Witnesses:
LOTTA LEE BRAY,
ELLIOTT J. STODDARD.